United States Patent
Klein (10) Patent No.: US 9,551,122 B1
(45) Date of Patent: Jan. 24, 2017

(54) FULLY ADJUSTABLE AIR DEFLECTOR SYSTEM FOR SNOW PLOW BLADES

(71) Applicant: David Earl Klein, Lewellen, NE (US)

(72) Inventor: David Earl Klein, Lewellen, NE (US)

(*) Notice: Subject to any disclaimer, the term of this patent is extended or adjusted under 35 U.S.C. 154(b) by 0 days.

(21) Appl. No.: 15/065,827

(22) Filed: Mar. 9, 2016

(51) Int. Cl.
*B60K 11/08* (2006.01)
*E01H 5/06* (2006.01)

(52) U.S. Cl.
CPC ............... *E01H 5/066* (2013.01); *B60K 11/08* (2013.01); *E01H 5/06* (2013.01)

(58) Field of Classification Search
CPC ......... B60K 11/00; B60K 11/06; B60K 11/08; E01H 5/06; E01H 5/061; E01H 5/062; E01H 5/063; E01H 5/065; E01H 5/066
USPC ................... 180/68.1; 37/241, 231
See application file for complete search history.

(56) References Cited

U.S. PATENT DOCUMENTS

| | | | |
|---|---|---|---|
| 3,432,947 A | 3/1969 | Peitl | |
| 4,587,750 A * | 5/1986 | Larson | E01H 5/066 180/68.1 |
| 4,896,915 A * | 1/1990 | Morandi | E01H 5/066 180/68.1 |
| 5,309,653 A | 5/1994 | Pease et al. | |
| 5,544,434 A | 8/1996 | Calvachio, Jr. | |
| 5,881,479 A * | 3/1999 | Pavey | E01H 5/066 180/68.1 |
| 5,966,845 A * | 10/1999 | DiGiacomo | E01H 5/066 296/180.1 |
| 6,035,560 A * | 3/2000 | Pender | E01H 5/066 296/180.5 |
| 2006/0185199 A1* | 8/2006 | Watros | E01H 5/066 37/231 |

* cited by examiner

*Primary Examiner* — John Walters
(74) *Attorney, Agent, or Firm* — Shifrin Patent Law; Dan Shifrin (57) ABSTRACT

A fully adjustable system is provided for reducing overheating of engines caused by the blockage of air flow by snow plow blades. One embodiment mountable onto blades of a split V-plow includes two elongated deflectors, two T-shaped mounting brackets, and a U-shaped slide bracket. When the system is assembled, the base plates are slidable in a direction parallel to the blade before the fasteners are tightened, the deflectors are slidable relative to the slide bracket in a direction parallel to the blade before the fasteners are tightened, the deflectors are slidable in a direction perpendicular to the blade before the fasteners are tightened, and the deflectors are angularly rotatable relative to a top lip of the blade.

11 Claims, 10 Drawing Sheets

FULLY ADJUSTABLE AIR DEFLECTOR SYSTEM FOR SNOW PLOW BLADES

RELATED APPLICATION DATA

The present application is related to commonly-owned and co-pending U.S. application Ser. Nos. 29/557,550 and 29/557,552, both entitled FULLY ADJUSTABLE AIR DEFLECTOR SYSTEM FOR V-BLADE SNOW PLOW, and both filed on the filing date hereof, which applications are incorporated herein by reference in their entireties. The present application is also related to commonly-owned U.S. application Ser. No. 12/288,973, now abandoned, entitled AIR DEFLECTOR FOR V-BLADE SNOW PLOW, filed on Oct. 24, 2008, which application is incorporated herein by reference in its entirety.

TECHNICAL FIELD

The present invention relates generally to snow plows and, in particular, to a fully adjustable system for reducing overheating of engines caused by the blockage of air flow by snow plow blades.

BACKGROUND ART

Snow plows on plow vehicles such as pickup trucks, dump trucks and the cause the plow vehicle to suffer a cooling problem. The issue is not the weight nor the drag of the plow but rather the airflow disruption engendered by the snow plow.

Figure 1:
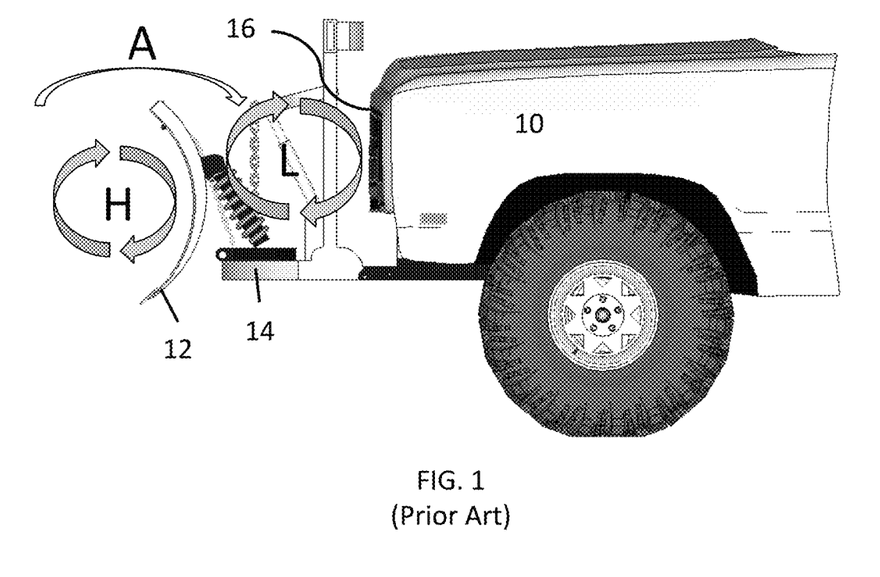
FIG. 1 is a prior art side view of a snow plow blade mounted to the front of a vehicle.

To illustrate this problem, FIG. 1 shows a side view of a plow vehicle 10 with a plow 12 and ancillary mounting equipment 14. However, it is apparent from viewing this side view that air flow is massively disrupted from its normal straight flow. As the vehicle 10 moves under normal circumstances, it is designed to generate a largely unimpeded airflow to radiator 16. With a curved blade 12 in front of the radiator 16, however, the air flow is disrupted and is scooped up by the upper edge and body of the blade 12, generating a high pressure area CH in front of the blade 12 in the exact same manner in which the snow on the ground is scooped up by the lower edge and body. Plow blades may be commonly seen with a vortex of snow swirling around in the front of the blade, which eventually exits via one side (one end) of the horizontal blade. What is not visible to the naked eye is the fact that the air flow follows the same path, being entrained by the blade and snow in the high pressure area CH and carried around the end of the plow blade 12.

A limited amount of air passes over the plow blade 12 as shown by arrow CA'. This air from above the plow is pulled by a low pressure area 'L' behind the blade downward, thus resulting in a very small flow past radiator 16. However, this small flow exists in the partial vacuum 'L' generated by the blade 12. Since the vehicle radiator 16 is not designed for use in a partial vacuum, the real world result is that the vehicle engine begins to overheat in the midst of snow, forcing the operator to periodically stop and cool the engine or causing a significant loss of power.

This is not a theoretical issue. The overheating problem caused by the plow acting like a scoop to move air away from radiators has been long noted by plow operators and the reason for this understood. The problem, therefore, is of considerable vintage.

A search in the United States Patent Office Collection reveals previous attempts to solve this problem. U.S. Pat. Nos. 5,544,434 to Calvachio, Jr. and 4,587,750 to Larson teach airfoils or scoops which attempt to solve this problem. Testing these types of units reveals immediate flaws. In particular, the mountings of these devices are wildly inadequate to the battering received by snow plows. Real world snow plow blades are driven across rugged uneven surfaces and they may frequently encounter small but immovable obstacles which are completely hidden by the snow. An object as insignificant as a pebble embedded in a tarmac road surface can actually bring a plow vehicle to a halt, and more typical hidden obstacles include concrete gutters, sidewalks, curbs and the like. Most plows do not come to halt under such conditions, though, because the plow blades are normally hinged so that they can rotate when encountering a small object, with strong springs urging the plow blade back to normal position after the object is passed.

The battering, vibration and shaking the plow blade undergoes makes a mockery of the light mountings taught by the 1 434 and 750 references. As mentioned, testing showed that light mountings made to the rib 102 very quickly shake themselves free from the blade and vanish into the snow in front of the plow or under the wheels of the vehicle.

These mountings have other problems besides lack of durability. They do not allow easy height adjustments of the device for differing combinations of plows and vehicles. This is important to effectiveness: if an airfoil cannot be adjusted in height to gather the required amount of air and redirect it towards the radiator, then the device does not prevent the overheating / power loss problems seen by operators. A single height setting cannot provide this as plow vehicles come in a wide range of heights and radiators are variously disposed at various heights as well. Plows also come in a variety of heights and a variety of lengths of separation from the front of the vehicle. Finally the shapes of the plows results in differing degrees of vortex formation, and if an airfoil is not located at a location which receives a strong airflow, that is, if the air foil is located in the low pressure zone even though it is atop the blade, then the air foil in the low pressure zone cannot function in any event. The combinations of plows and vehicles means that the air foil must be adjustable not just in angle but also in height.

In addition, these devices do not easily fit to plows lacking such an upper rib, having an upper rib inappropriate for the mounting, or split V-blade plows.

These references teach two simple air foil shapes: a true air foil and a flat scoop. Thus, these devices are not found widely distributed among plow operators. In addition to the '434 patent to Calvachio, Jr. and the 750 to Larson, trunking or duct works have been tried to solve this problem. Examples of this include U.S. Pat. Nos. 5,881,479 to Pavey and 4,896,915 to Morandi et al. These patents do not disclose airfoils which ride above the plow blade but rather scoops which redirect a certain amount of the incoming air more closely toward the radiator. It is difficult to see how such trunking devices could possibly be made adjustable in height, particularly as imagination is required to guess the details of the mountings of these two devices. Some of these devices are too far forward to properly direct air to the vehicle radiator area. Others, such as the '915 device, have weak mounts, become clogged with snow, and reduce the effective turning radius of the plow vehicle by impinging into the area between the plow and the vehicle when the come close together during turns.

Finally, there are numerous deflectors which are designed to deflect snow which spills over the top of the plow blade and direct it downward actually away from the plow vehicle. (Abstract, U.S. Pat. No. 5,309,653 to Pease et al. and Col. 1, line 21, U.S. Pat. No. 3,432,947 to Peitl). Since these devices have a different function and result it seems safe to dismiss them and their kin as irrelevant to devices which try to direct air *toward* the plow vehicle: reference prior art cannot violate its own fundamental operation.

SUMMARY OF THE INVENTION

An embodiment of the present invention provides a fully adjustable air deflector system mountable on a split V-blade snow plow. The system comprises first and second air deflectors, first and second T-shaped mounting brackets, and a U-shaped slide bracket.

The air deflectors both comprise: an elongated middle section; a leading edge curved upwards approximately 90° relative to the middle section; a trailing edge curved downwards approximately 90° relative to the middle section; and a plurality of attachment slots formed through the middle section substantially perpendicular to the leading and trailing edges.

The first and second T-shaped mounting brackets both comprise: an elongated flat base plate having at least one mounting slot formed therethrough; and an upright plate having a bore hole formed therethrough and secured at a lower edge to the base plate approximately 90° relative to the base plate.

The U-shaped slide bracket comprises: an elongated middle section having at least two mounting slots formed therethrough parallel to a length of the slide bracket; and first and second end pieces at each end of the middle section, both end pieces angled approximately 90° downward relative to the middle section and having a bore hole formed therethrough.

Both base plates are adjustably mountable to one of two blades of a V-blade snow plow with a fastener through the at least one mounting slot. Each end piece of the slide bracket is adjustably mountable to one of the upright plates with a fastener through the bore holes of the end pieces and upright plates. Each deflector is adjustably mountable to the slide bracket with fasteners through the attachment slots in the deflector and slide bracket. When assembled, the base plates are slidable in a direction parallel to the blade before the fasteners are tightened, the deflectors are slidable relative to the slide bracket in a direction parallel to the blade before the fasteners are tightened, the deflectors are slidable in a direction perpendicular to the blade before the fasteners are tightened, and the deflectors are angularly rotatable relative to a top lip of the blade.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 2:
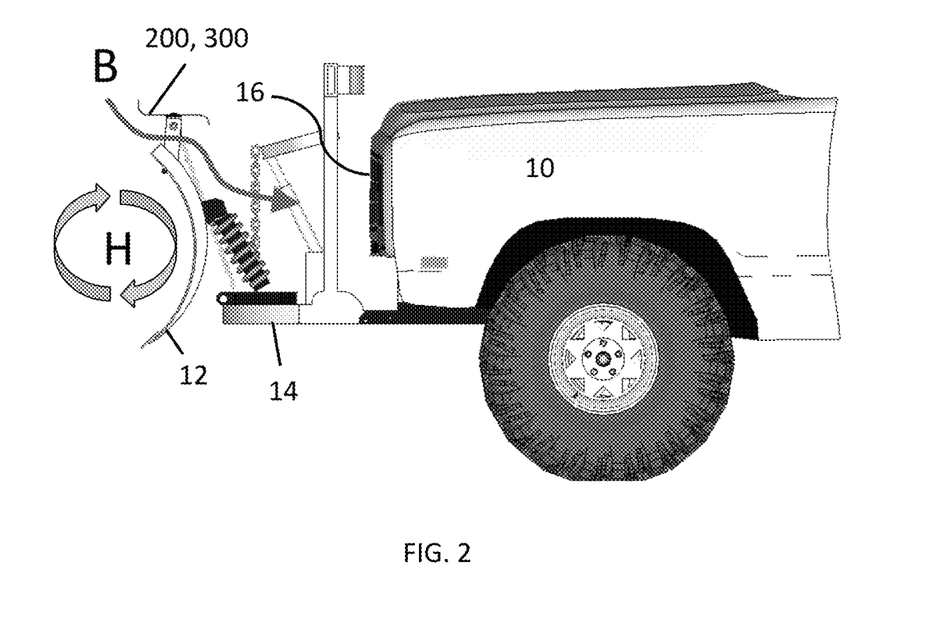
FIG. 2 is a side view of an embodiment of an air deflector system of the present invention mounted on a snow plow blade mounted to the front of a vehicle.

FIG. 2 is a side view of an embodiment of an air deflector system 100 of the present invention mounted on the snow plow blade 12, in turn mounted to the front of the vehicle 10. Although a high pressure area CH is created in front of the blade 12, the deflector system 100 forces air over and behind the blade 12, as illustrated by the arrow 'B,' eliminating the low pressure area and allowing the air to flow freely past the radiator 16. The deflector system 100 is equally effective when mounted on a straight blade or a split V-blade.

Figure 3:
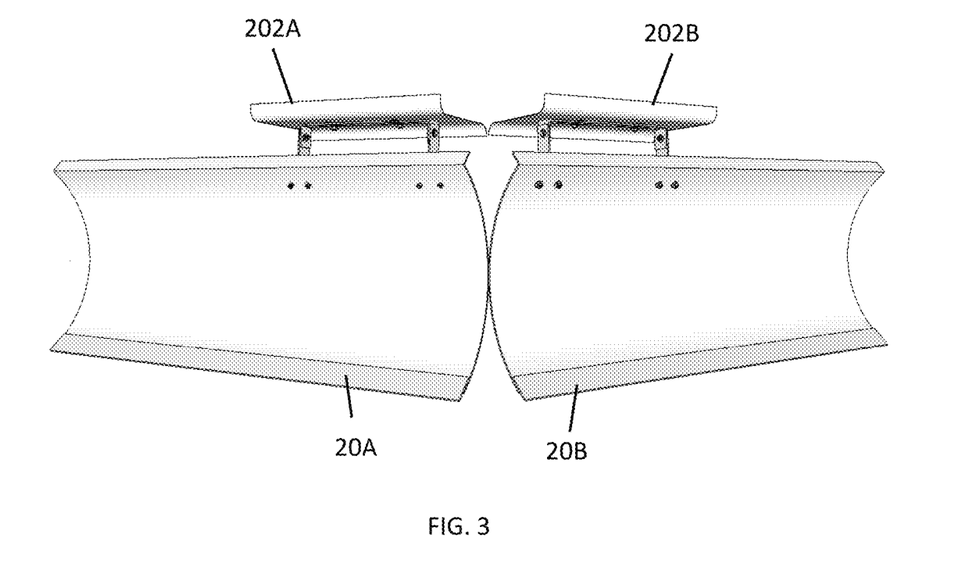
FIG. 3 is a front view of an embodiment of an air deflector system of the present invention mounted on a split-V snow plow blade ("V-blade)
Figure 4:
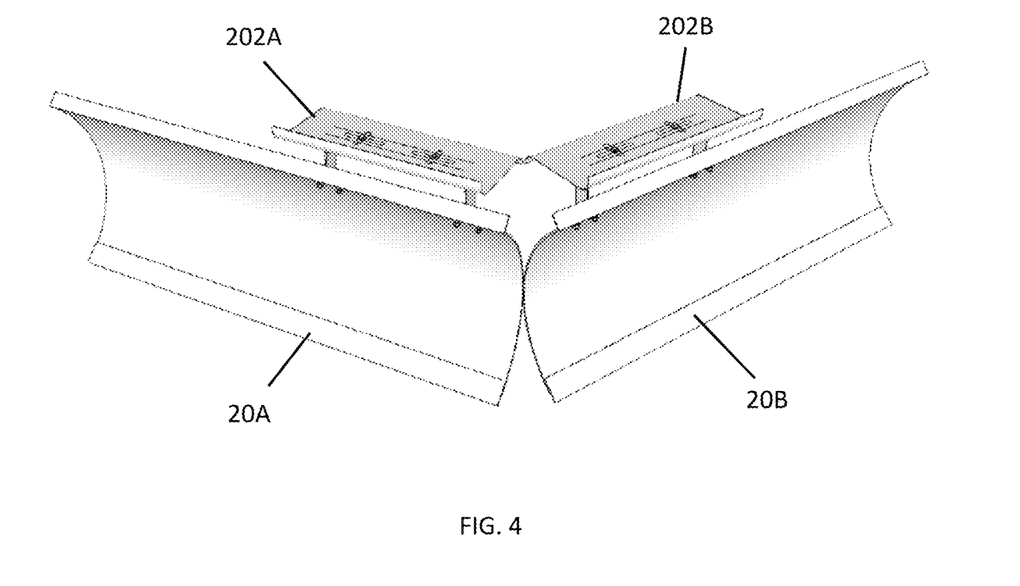
FIG. 4 is a top front perspective view of the air deflector system of FIG. 3 mounted on the V-blade.
Figure 5:
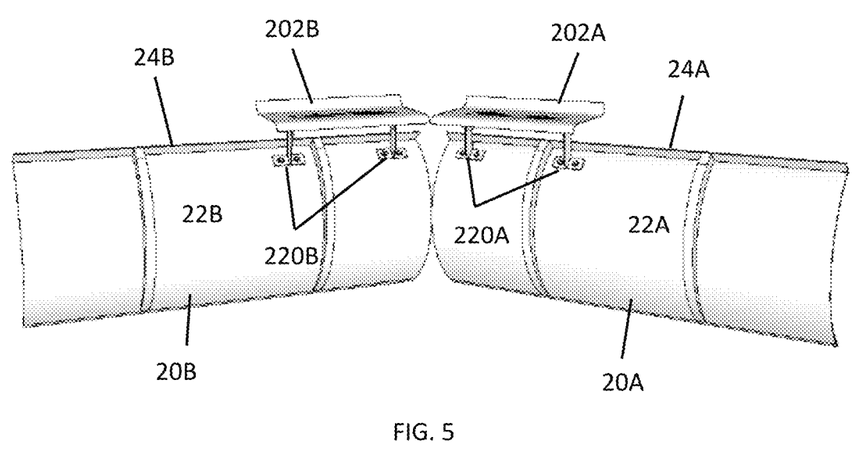
FIG. 5 is a rear view of the air deflector system of FIG. 3 mounted on the V-blade.
Figure 6:
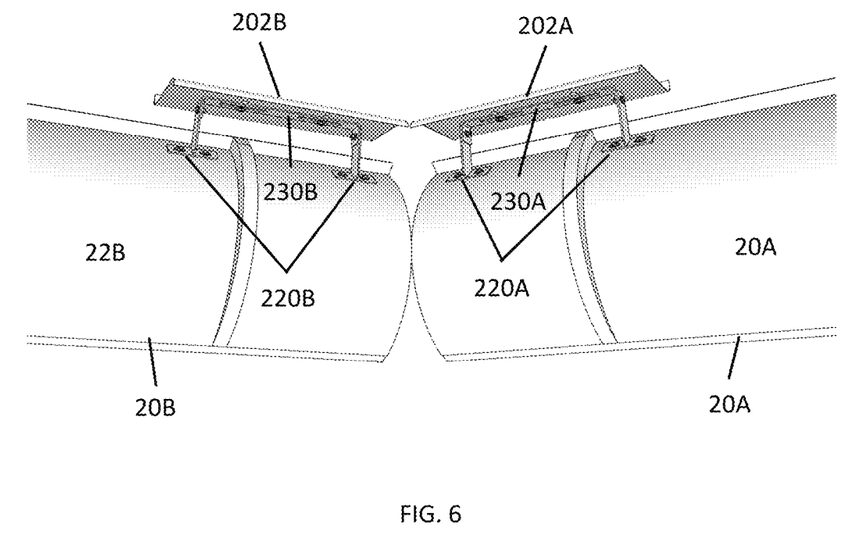
FIG. 6 is a rear perspective view of the bottom of the air deflector system of FIG. 3 mounted on the V-blade.

FIGS. 3 and 4 are front views of an embodiment of an air deflector system 200 of the present invention mounted on a V-blade. FIGS. 5 and 6 are rear views of the system 200. The system 200 includes two air deflectors 202A, 202B and associated hardware for mounting the deflectors to the two blade sections 20A, 20B. The two deflectors 202A, 202B are identical and will be referred to collectively as 202. Similarly, the two blades 20A, 20B are identical and will be referred to collectively as 20.

Figures 7, 8:
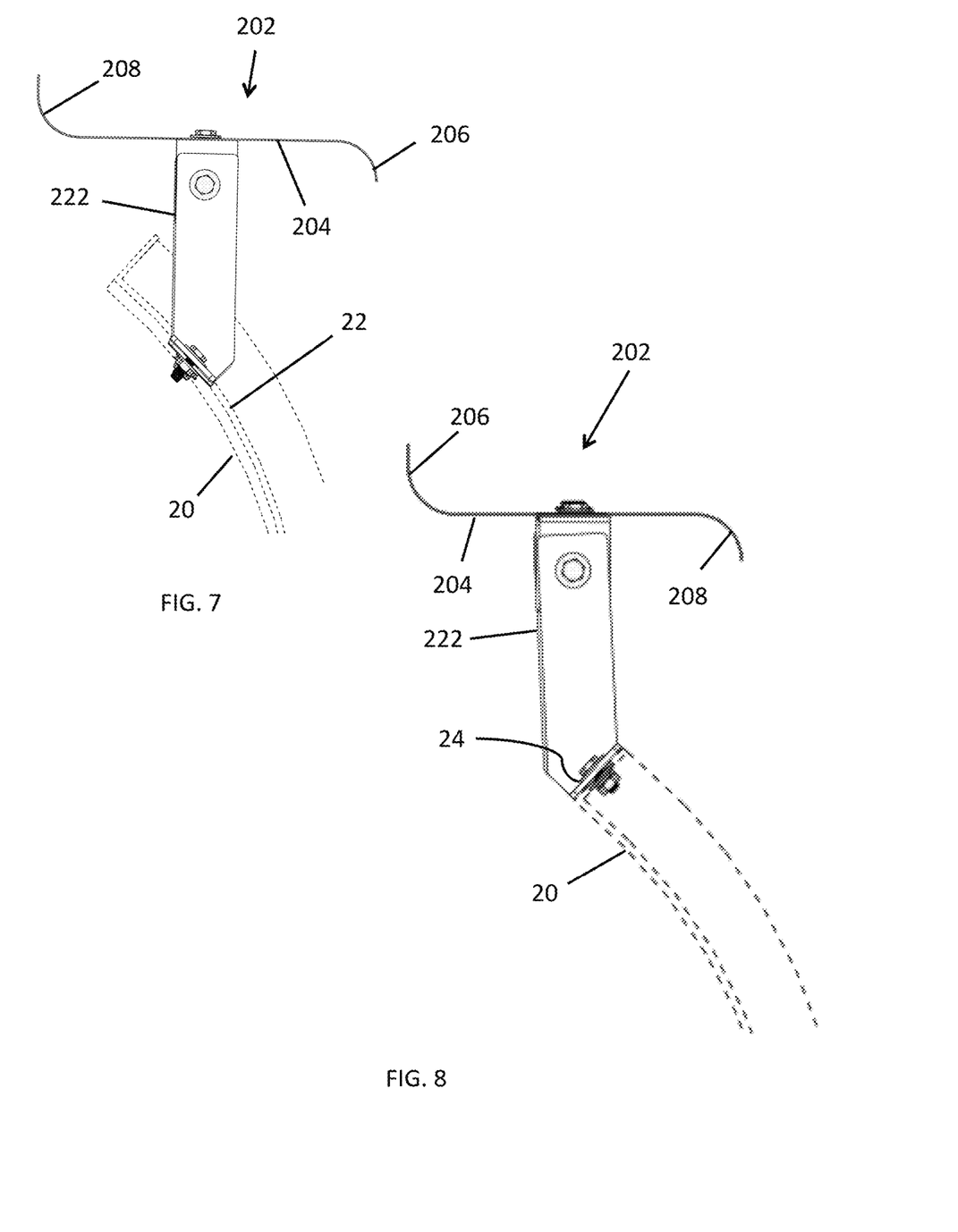
FIG. 7 is a side view of the air deflector system of FIG. 3 mounted on the rear surface of the V-blade.
FIG. 8 is a side view of the air deflector system of FIG. 3 mounted on the top lip of the V-blade.

As illustrated in FIGS. 7 and 8, the deflector 202 may be mounted either to the back surface 22 of the blade 20 (FIG. 7) or to the top lip 24 of the blade 20 (FIG. 8). The deflector 202 has an elongated flat middle section 204, an upwardly curved leading section 206, and a downwardly curved trailing section 208. Two slots 210A, 210B (collectively 210) are formed through the middle section 204 perpendicular to the length of the deflector 200 approximately halfway between the leading and trailing edges 206, 208. In one embodiment, the leading and trailing sections 206, 208 are curved approximately 90° relative to the middle section 204 with a radius of curvature of approximately 1 inch. The middle section 204 is about 5 inches wide between the leading and trailing sections 206, 208. The slots 210 are approximately 2-½ inches long and approximately ½ inches wide and are spaced approximately 6-½ inches apart, equidistant from the longitudinal center of the deflector 200. The total width of the deflector 200 is approximately 8-½ inches and the length is approximately 20 inches. It will be appreciated that other dimensions may be used when manufacturing deflectors 200 to accommodate blades 20 of different dimensions and configurations.

Figure 9:
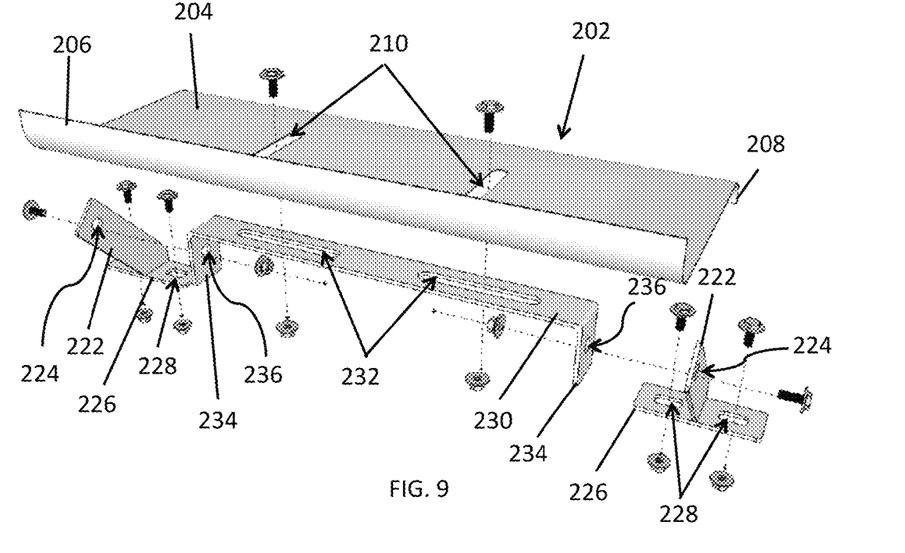
FIG. 9 is an exploded view of the air deflector system of FIG. 3.

FIG. 9 is an exploded view of the air deflector system 200. In addition to the deflector 202, the system 200 includes a pair of angled T-shaped mounting brackets 220 and a U-shaped slide bracket 230. The mounting bracket 220 includes an angled upright plate 222 with a bore hole 224 at its upper end for securing the slide bracket 230 to the mounting bracket 220. The upright plate 222 is secured at a lower edge, such as by welding, at approximately 90° to the center of an elongated flat base plate 226. The base plate 226 has a longitudinal mounting slot 228 on both sides of the angled upright plate 222 for securing the mounting bracket 220 to the plow blade 20. The slide bracket 230 has an elongated middle section with two mounting slots 232 parallel to the length of the slide bracket 230 for securing the deflector 200 to the slide bracket 230. The slide bracket 230 also has two 90° downwardly angled end pieces 234, each with a bore hole 236.

In one embodiment, the upright plate 222 has an angle of approximately 45° relative to the base plate 224 to allow the base plate 224 to be mounted to an angled surface of the plow blade 20 with the upright plate 222 rising approximately vertically relative to the ground. The upright plate 222 is approximately five inches long and 1-½ inches wide. The base plate is approximately four inches long and 1-½ inches wide; the slots 228 are approximately one inch long. The slide bracket 230 is approximately 14 inches long and approximately 1-½ inches wide with the ends 234 approximately 2 inches long turned 90° downward. The slots 232 are approximately 4 inches long, approximately ½ inches wide, and spaced equidistant from the center of the slide bracket 230. For strength and durability, the mounting bracket 220 and the slide bracket 230 may be cut from 5/16" steel plate or angle.

To assemble the air deflector system 200, each deflector 202 is secured to the slide bracket 230 with such fasteners as bolts and nuts, which initially do not need to be tightened. The mounting brackets 220 are secured to the turned-down ends 234 of the slide bracket 230, again with such fasteners as bolts and nuts, which also do not need to be tightened. The assembled system 200 may then be held on the back surface 22 or top lip 24 of the blade 20 with the curved upper leading section 206 of the deflector facing in the same direction as the blade 20. The proper location may be determined such that the inner end of each deflector 202 is approximately even with the inner end of each blade 20. Holes may then be drilled through the blade 20 and each mounting bracket 220 loosely secured to the blade 20, with such fasteners as bolts and nuts.

Figure 10:
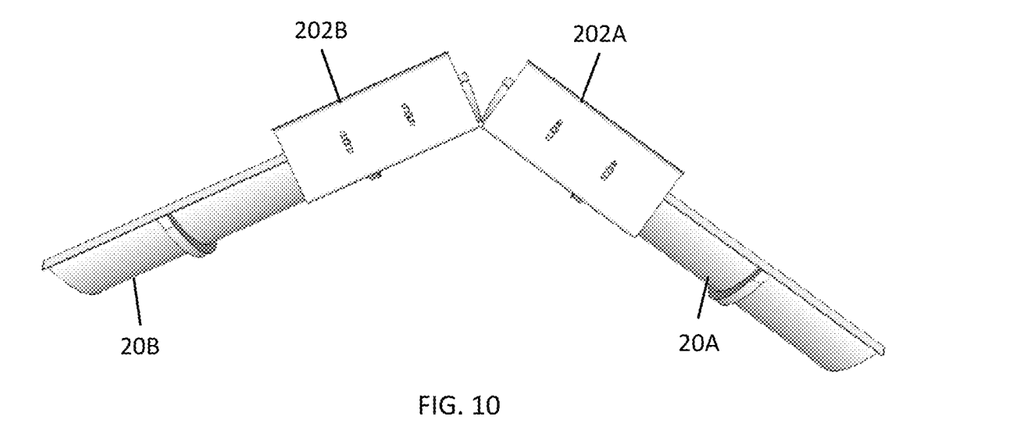
FIG. 10 is a top view of the air deflector system of FIG. 3 mounted on the V-blade.

The exact position of the two assemblies may now be finalized by moving the mounting brackets 220 parallel to the blade 20 along the slots 228 in the mounting bracket 220. The deflector 202 may be adjusted in both the parallel and perpendicular directions relative to the blade 20 along the slots 232 in the slide bracket 230 and the slots 210 in the deflector 202, respectively. The angle of the deflector 202 and slide bracket 230 relative to the ground may also be adjusted, such as to offset the angle of the blade surface to which the mounting bracket 220 is secured. Thus, the deflector system 200 may be installed on blades with a wide variation in surface angles. When the position and angle of each deflector 202 has been finalized, all of the fasteners may be tightened to lock the system 200 in place. It will also be appreciated that the mounting brackets 220 may be welded onto the back surface 22 or top lip 24 of the blade 20. FIG. 10 is a bottom view of the assembled but unmounted deflector system 200 and illustrates the slots 210, 228, 232 and fasteners which may be used to adjust the position and angle of the deflectors 202 relative to the blades 20.

Figure 11:
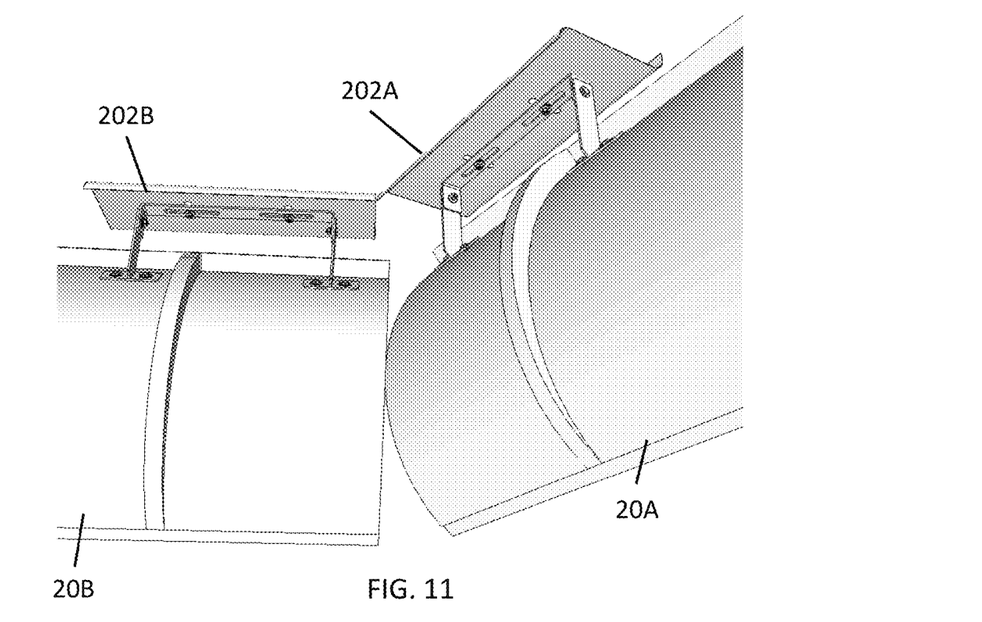
FIG. 11 is a bottom view of the air deflector system of FIG. 3 mounted on the V-blade.
Figure 12:
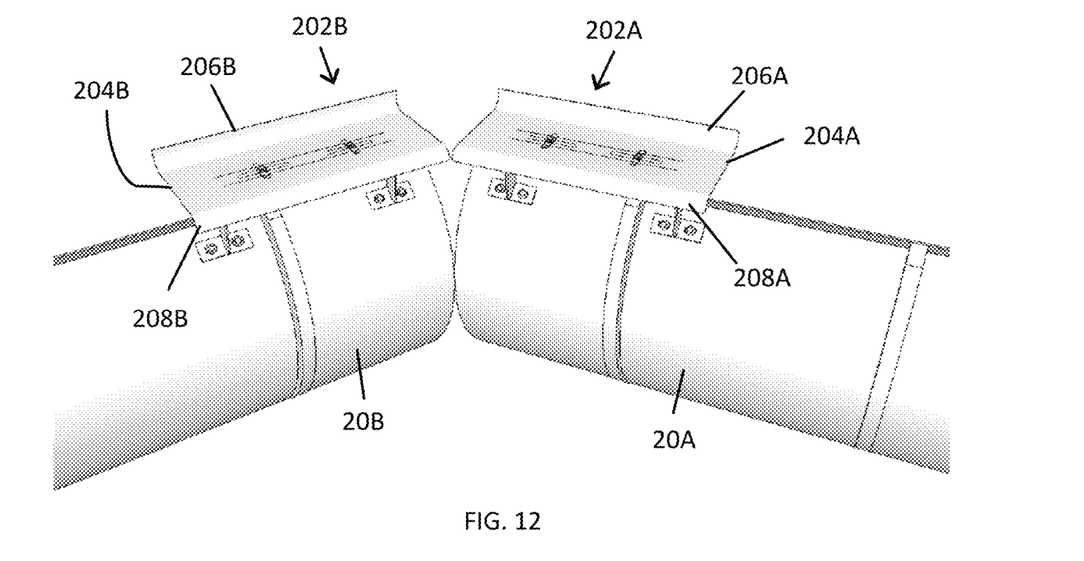
FIG. 12 is a rear perspective view of the top of the air deflector system of FIG. 3 mounted on the V-blade.

FIGS. 10-12 are rear bottom perspective, rear perspective, and top views, respectively, of the air deflector system 200 mounted on the two blades 20A, 20B of a split V-blade plow and particularly illustrate the adjustment options provided by the air deflection system 200 of the present invention. After adjusting the positions of the two deflectors 202, their inner edges are substantially aligned with the inner edges of the blades 20 and their inner rear corners a close to, if not touching, each other. The angle of the deflectors 202 is preferably parallel with the ground as illustrated in FIG. 2 although, as noted above, it may be adjusted to provide the desired air flow across the vehicle's radiator.

Figure 13:
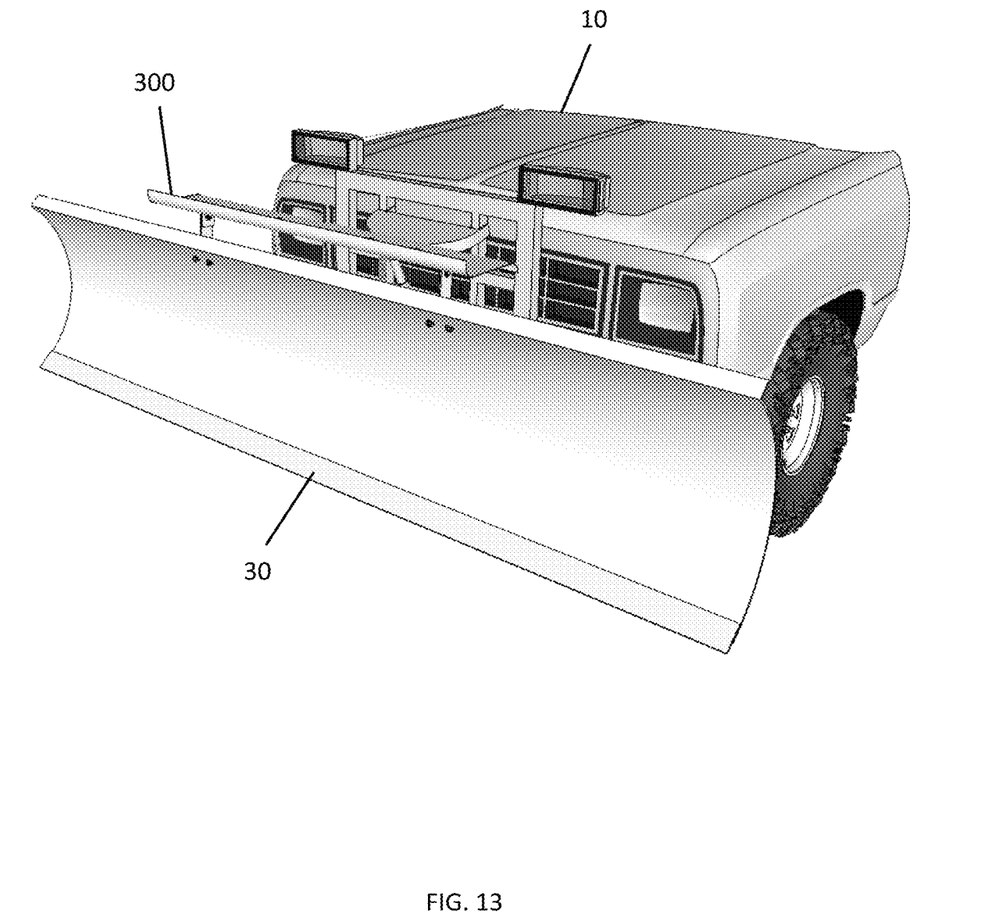
FIG. 13 is a front perspective view of another embodiment of the air deflector system of the present invention mounted on a straight snow plow blade.

FIG. 13 is a front view of another embodiment of an air deflector system 300 of the present invention mounted on a straight plow blade 30. The system 300 includes an air deflector 302 and associated hardware for mounting the deflector to the blade 30.

Figure 14:
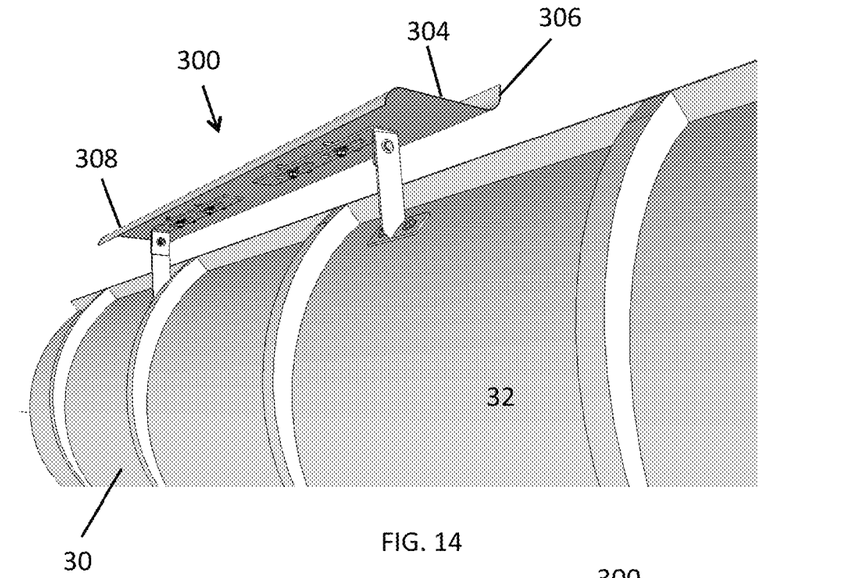
FIG. 14 is a side view of the air deflector system of FIG. 13 mounted on the rear surface of the straight-blade.
Figure 15:
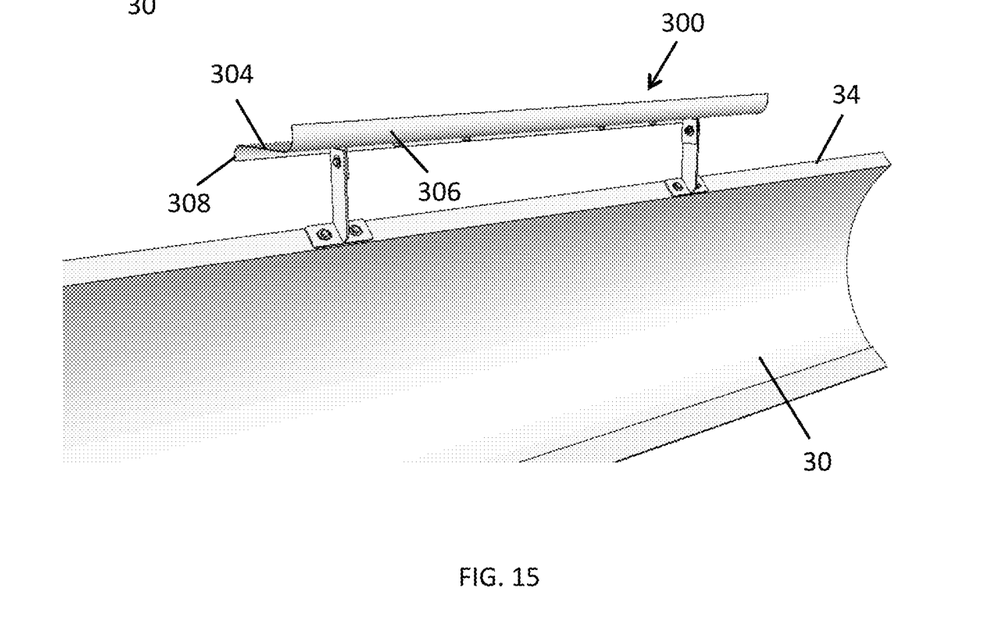
FIG. 15 is a side view of the air deflector system of FIG. 13 mounted on the top lip of the straight-blade.

As illustrated in FIGS. 14 and 15, the deflector 302 may be mounted either to the back surface 32 of the blade 30 (FIG. 14) or to the top lip 34 of the blade 30 (FIG. 15). The deflector 302 has an elongated flat middle section 304, an upwardly curved leading section 306, and a downwardly curved trailing section 308. Two sets 310A, 310B (collectively 310) of two slots each are formed through the middle section 304 perpendicular to the length of the deflector 300. In one embodiment, the leading and trailing sections 306, 308 are curved approximately 90° relative to the middle section 304 with a radius of curvature of approximately 1 inch. The middle section 304 is about 5 inches wide between the leading and trailing sections 306, 308. The slots 310 are approximately 2-½ inches long and approximately ½ inches wide and are spaced approximately 5 inches apart, with the sets of slots being about 11 inches apart and equidistant from the longitudinal center of the deflector 300. The total width of the deflector 300 is approximately 7 inches and the length is approximately 40 inches. It will be appreciated that other dimensions may be used when manufacturing deflectors 300 to accommodate blades 30 of different dimensions and configurations.

Figure 16:
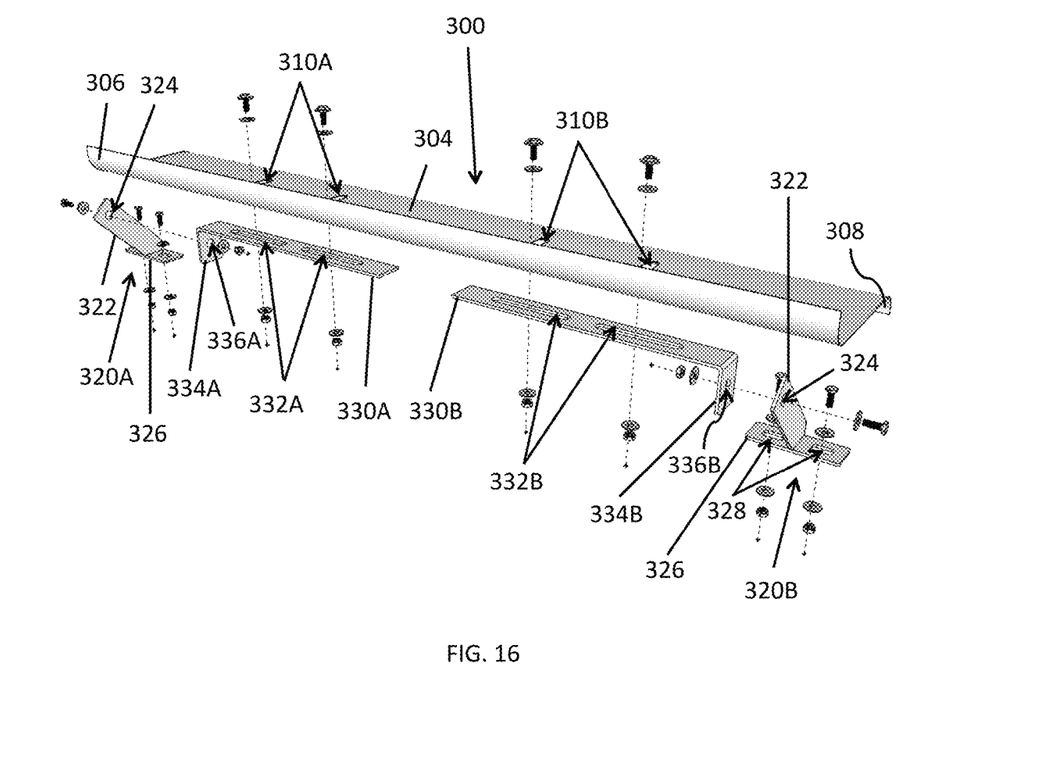
FIG. 16 is an exploded view of the air deflector system of FIG. 13

FIG. 16 is an exploded view of the air deflector system 300. In addition to the deflector 30, the system 300 includes a pair of angled T-shaped mounting brackets 320A, 320B (collectively referred to as 320) and a pair of elongated L-shaped slide brackets 330A, 330B (collectively 330). Each mounting bracket 320 includes an angled upright plate 322 with a bore hole 324 at its upper end for securing the respective slide bracket 330 to the mounting bracket 320. The upright plate 322 is secured, such as by welding, at approximately 90° to the center of a flat base plate 326. The base plate 326 has a longitudinal mounting slot 328 on both sides of the angled upright plate 322 for securing the mounting bracket 320 to the plow blade 30. The slide bracket 330 has two mounting slots 332A, 332B (collectively 332) for securing the deflector 300 to the slide bracket 330.

In one embodiment, the upright plate 322 has an angle of approximately 45° relative to the base plate 326 to allow the base plate 326 to be mounted to an angled surface of the plow blade 30 with the upright plate 322 rising approximately vertically relative to the ground. The upright plate 322 is approximately five inches long and 1-½ inches wide. The base plate 326 is approximately four inches long and 1-½ inches wide; the slots 328 are approximately one inch long. Each slide bracket 330 is approximately 13 inches long and approximately 1-½ inches wide with an outer end 334A, 334B (collectively 334) approximately 2 inches long turned 90° downward. Each outer end 334 has a bore hole 336A, 336B for securing to the upright plate 326. The slots 332 are approximately 4 inches long, approximately ½ inches wide, and spaced equidistant from the center of the slide bracket 330.

To assemble the air deflector system 300, the deflector 302 is secured to the slide brackets 330 with such fasteners as bolts and nuts, which initially do not need to be tightened. The mounting brackets 320 are secured to the turned-down ends 334 of the slide brackets 330, again with such fasteners as bolts and nuts, which also do not need to be tightened. The assembled system 300 may then be held on the back surface 32 or top lip 34 of the blade 30 with the curved upper leading section 306 of the deflector facing in the same direction as the blade 30. The proper location may be determined such that the deflector 302 is approximately centered along the blade 30. Holes may then be drilled through the blade 30 and both mounting brackets 320 loosely secured to the blade 30, with such fasteners as bolts and nuts.

The exact position of the two assemblies may now be finalized by moving the mounting brackets 320 parallel to the blade 30 along the slots 328 in the mounting brackets 320. The deflector 30 may be adjusted in both the parallel and perpendicular directions relative to the blade 30 along the slots 332 in the slide brackets 330 and the slots 310 in the deflector 302, respectively. The angle of the deflector 302 and slide bracket 330 relative to the ground may also be adjusted, such as to offset the angle of the blade surface to which the mounting bracket 320 is secured. Thus, the deflector system 300 may be installed on blades with a wide variation in surface angles. When the position and angle of each deflector 302 has been finalized, all of the fasteners may be tightened to lock the system 300 in place.

Figure 17:
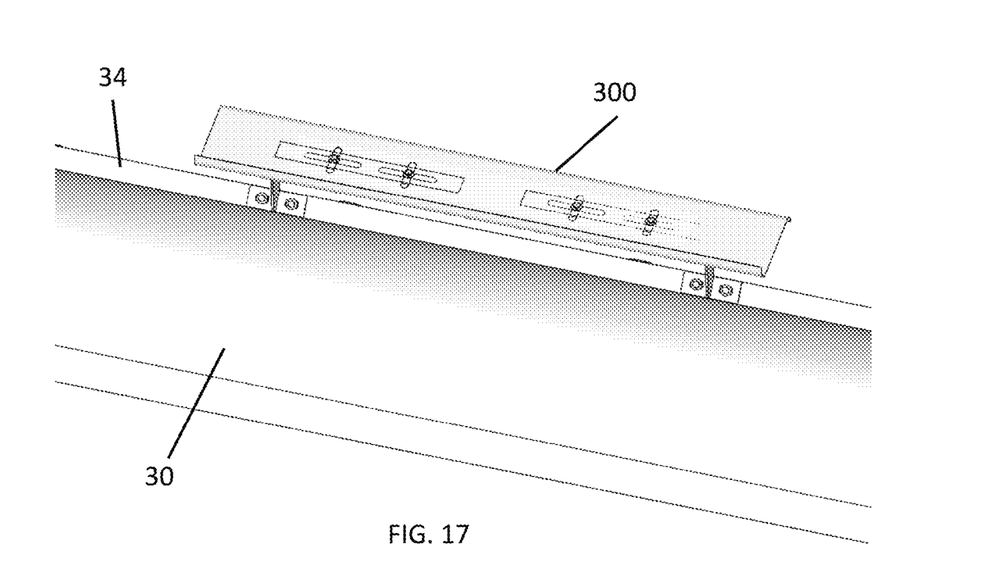
FIG. 17 is a top front x-ray view of the air deflector system of FIG. 13 mounted on the straight-blade.
Figure 18:
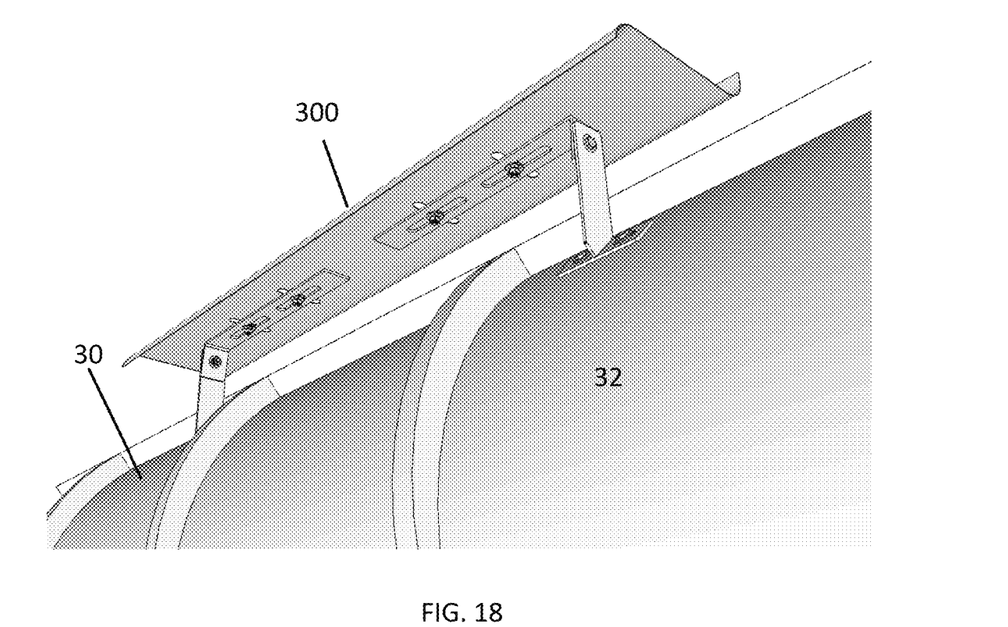
FIG. 18 is a rear perspective view of the bottom of the air deflector system of FIG. 13 mounted on the straight-blade.

FIGS. 17 and 18 are a top front and bottom rear perspective views of the assembled deflector system 300 mounted on the top lip 34 and back surface 32, respectively, of a straight-blade 30 and particularly illustrate the adjustment options provided by the air deflection system 300 of the present invention. The angle of the deflector 302 is preferably parallel with the ground as illustrated in FIG. 2 although, as noted above, it may be adjusted to provide the desired air flow across the vehicle's radiator.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A fully adjustable air deflector system mountable on a split V-blade snow plow, comprising:
   first and second air deflectors, each comprising:
   an elongated middle section;
   a leading edge curved upwards approximately 90° relative to the middle section;
   a trailing edge curved downwards approximately 90° relative to the middle section; and
   a plurality of attachment slots formed through the middle section substantially perpendicular to the leading and trailing edges;
   first and second T-shaped mounting brackets, each comprising:
   an elongated flat base plate having at least one mounting slot formed therethrough; and
   an upright plate having a bore hole formed therethrough and secured at a lower edge to the base plate approximately 90° relative to the base plate; and
   a U-shaped slide bracket, comprising:
   an elongated middle section having at least two mounting slots formed therethrough parallel to a length of the slide bracket; and
   first and second end pieces at each end of the middle section, both end pieces angled approximately 90° downward relative to the middle section and having a bore hole formed therethrough;
   wherein:
   both base plates are adjustably mountable to one of two blades of a V-blade snow plow with a fastener through the at least one mounting slot;
   each end piece of the slide bracket is adjustably mountable to one of the upright plates with a fastener through the bore holes of the end pieces and upright plates; and
   the deflector is adjustably mountable to the slide bracket with fasteners through the attachment slots in the deflector and slide bracket;
   whereby:
   the base plates are slidable in a direction parallel to the blade before the fasteners are tightened;
   the deflectors are slidable relative to the slide bracket in a direction parallel to the blade before the fasteners are tightened;
   the deflectors are slidable in a direction perpendicular to the blade before the fasteners are tightened; and
   the deflectors are angularly rotatable relative to a top lip of the blade.

2. The air deflector system of claim 1, wherein:
   the first deflector is mountable on the top lip of the first blade; and
   the second deflector is mountable on the top lip of the second blade.

3. The air deflector system of claim 1, wherein:
   the first deflector is mountable on the back surface of the first blade; and
   the second deflector is mountable on the back surface of the second blade.

4. A fully adjustable air deflector system mountable on a snow plow blade, comprising:
   a first air deflector mountable on a first snow plow blade, comprising:
   an elongated middle section;
   a leading edge curved upwards approximately 90° relative to the middle section;
   a trailing edge curved downwards approximately 90° relative to the middle section; and a plurality of attachment slots formed through the middle section substantially perpendicular to the leading and trailing edges;

first and second T-shaped mounting brackets, each comprising:
  an elongated flat base plate having at least one mounting slot formed therethrough; and
  an upright plate having a bore hole formed therethrough and secured at a lower edge to the base plate approximately 90° relative to the base plate; and first and second L-shaped slide brackets, each comprising:
  an elongated middle section having at least two mounting slots formed therethrough parallel to a length of the slide bracket; and
  an end piece at an outer end of the middle section angled approximately 90° downward relative to the middle section and having a bore hole formed therethrough;

wherein:
  the base plates of the first and second mounting brackets are adjustably mountable to the first snow plow blade with a fastener through the at least one mounting slot;
  the end piece of each slide bracket is adjustably mountable to one of the upright plates of a corresponding one of the first and second mounting brackets with a fastener through the bore holes of the end pieces and upright plates; and
  the first deflector is adjustably mountable to the first and second slide brackets with fasteners through the attachment slots in the first deflector and first and second slide brackets;

whereby:
  the base plates are slidable in a direction parallel to the first blade before the fasteners are tightened;
  the first deflector is slidable relative to the first and second slide brackets in a direction parallel to the first blade before the fasteners are tightened;
  the first deflector is slidable in a direction perpendicular to the first blade before the fasteners are tightened; and
  the first deflector is angularly rotatable relative to a top lip of the first blade.

5. The air deflector system of claim 4, wherein the first and second T-shaped brackets are mountable on the top lip of the first blade.

6. The air deflector system of claim 4, wherein the first and second T-shaped brackets are mountable on the back surface of the first blade.

7. The air deflector system of claim 4, wherein the first and second L-shaped slide brackets comprise a single, U-shaped bracket.

8. The air deflector system of claim 4, wherein the first snow plow blade is a first blade of a split V-blade snow plow, the air deflector system further comprising:
  a second air deflector mountable on a second snow plow blade of the split V-blade snow plow, the second air deflector comprising:
    an elongated middle section;
    a leading edge curved upwards approximately 90° relative to the middle section;
    a trailing edge curved downwards approximately 90° relative to the middle section; and
    a plurality of attachment slots formed through the middle section substantially perpendicular to the leading and trailing edges;
  third and fourth T-shaped mounting brackets, each comprising:
    an elongated flat base plate having at least one mounting slot formed therethrough; and
    an upright plate having a bore hole formed therethrough and secured at a lower edge to the base plate approximately 90° relative to the base plate; and
  third and fourth L-shaped slide brackets, each comprising:
    an elongated middle section having at least two mounting slots formed therethrough parallel to a length of the slide bracket; and
    an end piece at an outer end of the middle section angled approximately 90° downward relative to the middle section and having a bore hole formed therethrough;

wherein:
  the base plates of the third and fourth mounting brackets are adjustably mountable to the second snow plow blade with a fastener through the at least one mounting slot;
  the end piece of each slide bracket is adjustably mountable to one of the upright plates of a corresponding one of the third and fourth mounting brackets with a fastener through the bore holes of the end pieces and upright plates; and
  the second deflector is adjustably mountable to the third and fourth slide brackets with fasteners through the attachment slots in the second deflector and third and fourth slide brackets;

whereby:
  the base plates are slidable in a direction parallel to the second blade before the fasteners are tightened;
  the second deflector is slidable relative to the third and fourth slide brackets in a direction parallel to the second blade before the fasteners are tightened;
  the second deflector is slidable in a direction perpendicular to the second blade before the fasteners are tightened; and
  the second deflector is angularly rotatable relative to a top lip of the second blade.

9. The air deflector system of claim 8, wherein:
the first and second T-shaped brackets are mountable on the top lip of the first blade; and
the third and fourth T-shaped brackets are mountable on the top lip of the second blade.

10. The air deflector system of claim 8, wherein:
the first and second T-shaped brackets are mountable on the back surface of the first blade; and
the third and fourth T-shaped brackets are mountable on the back surface of the second blade.

11. The air deflector system of claim 8, wherein:
the first and second L-shaped slide brackets comprise a first single, U-shaped bracket; and
the third and fourth L-shaped slide brackets comprise a second single, U-shaped bracket.

* * * * *